United States Patent [19]

Dykstra

[11] Patent Number: 4,922,391

[45] Date of Patent: May 1, 1990

[54] VANITY MIRROR PACKAGE

[75] Inventor: Steven P. Dykstra, Zeeland, Mich.

[73] Assignee: Prince Corporation, Holland, Mich.

[21] Appl. No.: 296,069

[22] Filed: Jan. 12, 1989

[51] Int. Cl.⁵ .......................................... F21V 33/00
[52] U.S. Cl. ................................ 362/144; 362/83.1;
296/97.2
[58] Field of Search ............... 362/61, 136, 137, 142,
362/143, 144, 135, 83.1; 296/97.2, 97.5

[56] References Cited

U.S. PATENT DOCUMENTS

| | | | |
|---|---|---|---|
| 4,227,241 | 10/1980 | Marcus | 362/61 |
| 4,486,819 | 12/1984 | Marcus et al. | 362/142 |
| 4,564,234 | 1/1986 | Kaiser et al. | 296/97 H |
| 4,648,011 | 3/1987 | Boote et al. | 362/135 |
| 4,653,798 | 3/1987 | White et al. | 296/97 H |
| 4,683,522 | 7/1987 | Viertel et al. | 362/135 |
| 4,685,723 | 8/1987 | Canadas | 296/97 H |
| 4,763,946 | 8/1988 | Robbins et al. | 296/97 H |
| 4,791,537 | 12/1988 | Fisher et al. | 362/135 |
| 4,794,497 | 12/1988 | Jönas et al. | 362/143 |

Primary Examiner—Stephen F. Husar
Attorney, Agent, or Firm—Price, Heneveld, Cooper, DeWitt & Litton

[57] ABSTRACT

A vanity mirror package for a visor includes a sliding cover having a handle which includes a light for providing illumination for use of the mirror in low ambient light conditions.

12 Claims, 2 Drawing Sheets

VANITY MIRROR PACKAGE

BACKGROUND OF THE INVENTION

The present invention pertains to a vanity mirror package and particularly one for use in a vehicle visor.

There exists several types of illuminated vanity mirror visors for utilization in vehicles. U.S. Pat. Nos. 4,227,241; 4,486,819; and 4,648,011 represent three different types of illuminated vanity mirror visors. Typically, with sliding covers such as dislosed in the latter U.S. Pat. No. 4,648,011, the sliding cover includes a handle for its operation within a recess in the visor and illumination means are positioned behind the cover when the cover is closed. This construction limits to some extent the size of the mirror which can be used.

SUMMARY OF THE PRESENT INVENTION

The system of the present invention improves upon the prior vanity mirror packages by providing a package in which illumination means is integrally included within the handle of the sliding cover as well as a unique frame assembly for the vanity mirror package which can readily be positioned within the body of a vehicle visor.

Visors embodying the present invention include a visor body having a recess and means for lockably receiving a vanity mirror package therein. The vanity mirror package in a preferred embodiment of the invention includes frame means for supporting a mirror therein and a guide track for slidably receiving a slidable cover for selectively covering and uncovering the mirror for use. In a preferred embodiment of the invention, the cover includes a handle means for its operation which handle means integrally includes an illumination means for directing light outwardly from the cover when the mirror is uncovered for facilitating use of the mirror in low ambient light conditions. These and other features, objects, and advantages of the present invention will become apparent upon reading the following description thereof together with reference to the accompanying drawings in which:

DETAILED DESCRIPTION OF THE PREFERRED EMBODIMENT

Figure 1:
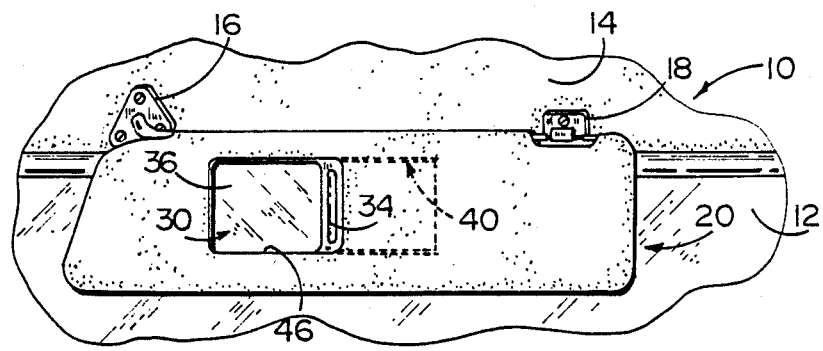
FIG. 1 is a fragmentary perspective view of a visor embodying the present invention with the mirror shown in an uncovered position.
Figure 2:
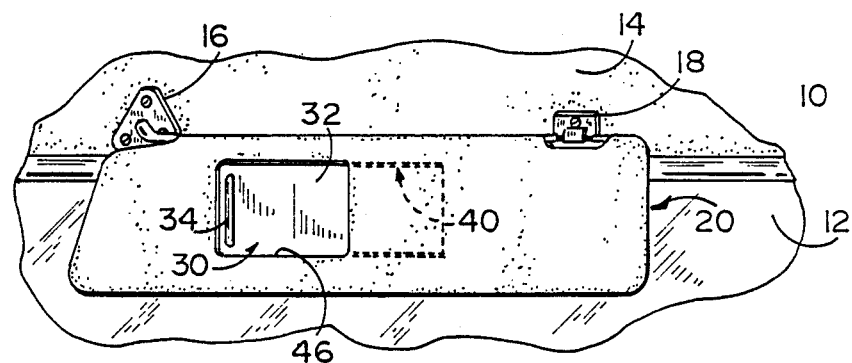
FIG. 2 is a fragmentary perspective view of a visor embodying the present invention with the mirror covered.
Figure 5:
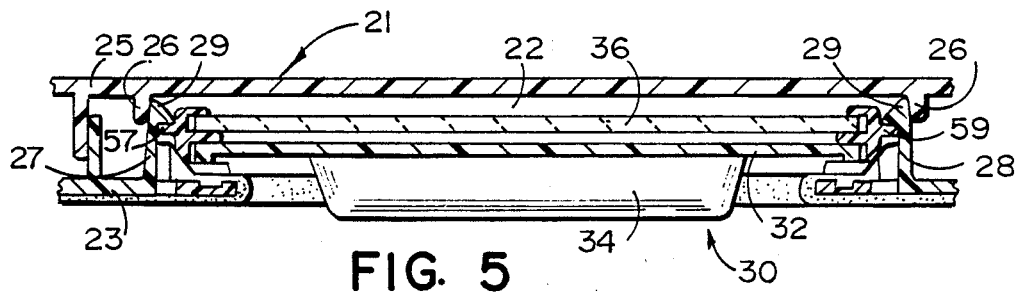
FIG. 5 is an enlarged, fragmentary, cross-sectional view taken along section lines V—V of FIG. 6.

Referring initially to FIGS. 1 and 2, there is shown a vehicle 10 including a windshield 12 above which there is mounted a visor 20 to the vehicle roof 14 utilizing a pivot elbow bracket assembly 16 and a supplemental visor clip 18 at opposite ends of the visor 20. Visor 20 includes an illuminated vanity mirror assembly 30 mounted therein with a sliding cover 32 having an illuminated handle 34 thereon. The illuminated vanity mirror package 30 fits as best seen in FIG. 5 within a recess 22 in the body 21 of visor 20 which body is formed in the preferred embodiment by a folded polymeric core having a front section 23 and a rear section 25 (FIG. 5) integrally joined in a clam shell-type configuration. The visor core construction may be of the type generally disclosed in U.S. Pat. No. 4,763,946, the disclosure of which is incorporated herein by reference.

In the preferred embodiment of the invention, the illuminated vanity mirror package is snap fitted and held within recess 22 by means of a pair of facing spaced resilient arms 27 and 28 (FIG. 5) which extend rearwardly from the front core half 23 and include inwardly projecting locking tabs 29 on their ends to hold package 30 in place as described in greater detail below.

Figure 3:
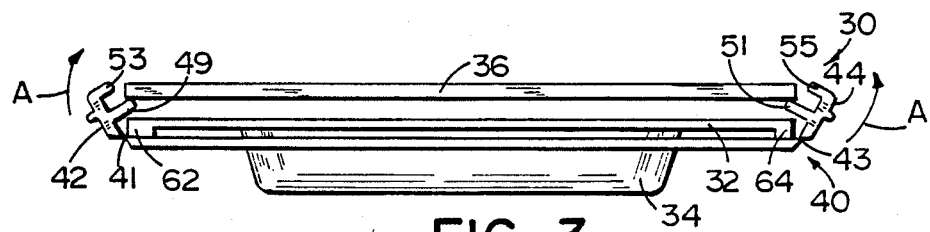
FIG. 3 is an enlarged end elevational view of the mirror package shown in FIGS. 1 and 2 shown in a partially assembled position.
Figure 4:
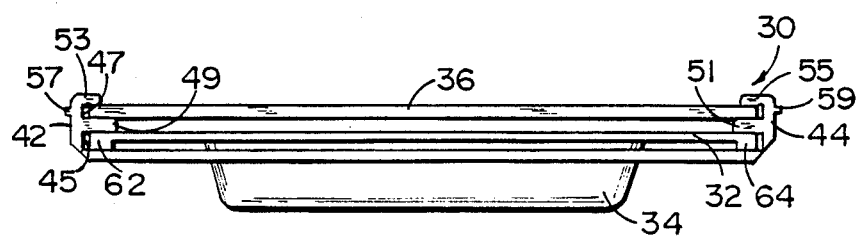
FIG. 4 is an enlarged end elevational view of the mirror package shown in FIGS. 1 and 2 shown in its assembled position.
Figure 6:
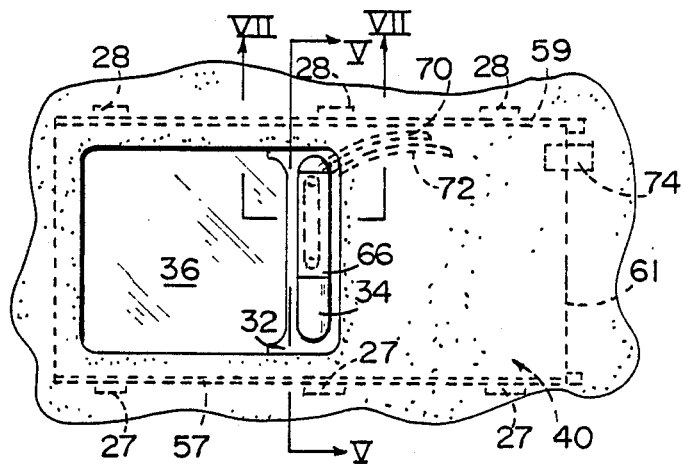
FIG. 6 is an enlarged, fragmentary, front elevational view of a portion of the structure of FIG. 1.

Turning now to FIGS. 3, 4, and 6, the illuminated vanity mirror package 30 includes a frame member 40 which is integrally formed from a suitable resilient polymeric material and includes a pair of elongated sides 42 and 44 integrally joined to the front of the frame by integral polymeric hinges 41 and 43, respectively, so that sides 42 and 44 can be bent upwardly as indicated in FIGS. 3 and 4 in a direction indicated by arrows A in FIG. 3 during assembly. In the preferred embodiment, the frame is formed by an extrusion process. Each of the sides 42 and 44 include a first cover receiving guide channel 45 extending adjacent the inner surface of the front of frame 40 and a second mirror-receiving channel 47 spaced inwardly therefrom. These channels in sides 42 and 44 are defined in part by inwardly projecting ledges 49 and 51, respectively, and inwardly turned lips 53 and 55, respectively. The cover 32 including handle 34 can also be integrally molded of a polymeric material and slidably fits within side channels 45 and includes glide members 62 and 64 at opposite edges thereof to minimize the frictional engagement between cover 32 and frame 40 to promote sliding action of the cover within the elongated frame.

A mirror 36 is held within channel 47 once sides 42 and 44 are pivoted upwardly into a position shown in FIG. 4 to captively hold the mirror in the assembly which is then snap fitted within recess 22 and held in place by arms 27 and 28 which lockably engage the outwardly projecting elongated lips 57 and 59 on members 42 and 44, respectively, as best seen in FIG. 5 to hold the package within the visor 20. Arms 27 and 28 are in turn held against excessive deflection by means of backing tabs 26 as also seen in FIG. 5. Frame 40 includes a rectangular opening 46 aligned with mirror 36 for exposing the mirror 36 when the cover is opened as seen in FIG. 1.

Cover 32 moves from an open position as illustrated in FIG. 1 by the utilization of handle 34 to a closed position as shown in FIG. 2 and covering mirror 36 when not in use for safety purposes. The mirror is illuminated for use in low ambient light conditions by lamp means incorporate within the handle 34 as now described in connection with FIGS. 6-9.

Figure 7:
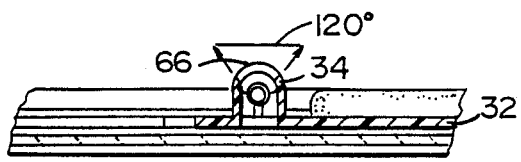
FIG. 7 is a fragmentary, cross-sectional view taken along section lines VII—VII of FIG. 6.

Handle 34 can be integrally molded with cover 32 and is a generally semi-cylindrical member having a transparent or translucent lens 66 extending over an arcuate section of the cylindrical handle circumscribing an arc of approximately 120° as shown in FIG. 7. Behind lens 66 there is positioned a lamp 68 mounted within a socket 69. A pair of conductors 70 and 72 (FIGS. 6 and 9) extend from the socket 69 to the vehicle's electrical supply system for activating lamps 68 with conductor 70 being coupled to a switch 74 which is mechanically actuated by the cover when it is moved to an open position as indicated by arrow C in FIG. 8. Conductor 72 is returned to the common terminal of the vehicle's supply such as battery 80 by connection to ground through the typically metallic pivot rod assembly 16 mounted to the sheet metal roof of the vehicle.

Figure 8:
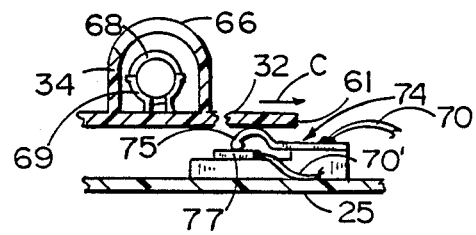
FIG. 8 is an enlarged, fragmentary cross-sectional view of the switch employed for activating the lamp shown in FIGS. 6 and 7.
Figure 9:
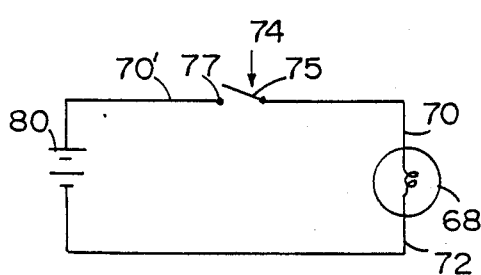
FIG. 9 is an electrical circuit diagram in schematic form of the illumination circuit employed in the present invention.

Conductor 70 extends to a movable contact 75 on switch 74 which is engaged by cover 60 when moved to an open position as illustrated in FIG. 8 to engage a fixed contact 77 having a conductor 70' extending to the vehicle's positive side supply conductor typically by extending through the hollow pivot rod assembly 16 of the visor 20. Conductors 70 and 72 are routed through a channel (not shown) formed in the underside of cover 60 or otherwise suitably coupled to the cover for connection to switch 74. For this purpose, the leads have a sufficient length and are looped in the recess 22 in visor 20 to allow their movement with the cover in relation to the stationary switch 74. Sufficient clearance is provided between the rear of cover 60 and the front surface of mirror 36 to allow clearance of such conductors and the movement of cover 60.

Switch 74 is positioned on visor core section 25 as shown schematically in FIG. 6 to be activated by the leading edge 61 of the cover when the cover is moved to the fully opened position. The switch likewise could be positioned anywhere along the length of travel of the cover such that it can be actuated by a relatively small movement of the cover such that the light could be illuminated and used as a vehicle interior light even if the mirror was not fully uncovered. Switch 74 can take on the forms such as by providing a shorting contact mounted to the cover which bridges a pair of fixed contacts on the visor core when the cover is opened. Switch 74 of FIG. 9 could also be mounted independently of the cover and manually actuated as desired by the user.

The handle 34 may be a separate molding attached to cover 60 and can be made of a transparent or translucent material in its entirety thereby eliminating the necessity of a separate lens 66 which is snap fitted therein in the preferred embodiment.

Thus it is seen by the present invention there is provided a three-piece illuminated vanity mirror insert which can be readily assembled as indicated in FIGS. 3-4 and snap fitted within a visor body as illustrated in FIG. 5 to provide a compact and inexpensive sliding vanity mirror visor. The illumination for the vanity mirror visor can be provided by illumination means positioned within the visor cover handle 43 and be selectively or automatically activated. It will become apparent to those skilled in the art that various modifications to the preferred embodiment of the invention as described herein can be made without departing from the spirit or scope thereof as defined by the appended claims.

The embodiments of the invention in which an exclusive property or privilege is claimed are defined as follows:

1. A visor including an illuminated vanity mirror assembly comprising:
   a visor body;
   a mirror and cover frame including guide means for receiving a slidable cover therein and a mirror support structure for supporting a mirror behind said cover;
   a cover slidably mounted within said guide means and including a handle projecting outwardly from an edge of said cover to extend through a rectangular opening in said frame;
   illumination means positioned within said handle of said cover to be exposed for all positions of said cover and for projecting illumination outwardly therefrom when actuated; and
   means for mounting said frame within said visor body.

2. The apparatus as defined in claim 1 and wherein said illumination means includes lamp means and switch means coupled to said lamp means and actuated by said cover for activating said lamp means when said cover is moved toward an open position.

3. The apparatus as defined in claim 2 wherein said mounting means comprises elongated lips extending outwardly from opposite sides of said frame and locking means in said visor body for engaging said lips.

4. A vanity mirror package for use in connection with a vehicle visor comprising:
   a frame member having a generally rectangular opening formed therein for exposing a mirror positioned behind said frame member, said frame member integrally including a pair of channel-defining sides; hinge means pivotally mounting said channel defining sides to each end of said frame member for pivotal movement toward one another, said channel defining sides when pivoted toward each other defining a first channel and a second channel, said first channel being located proximate said frame member for receiving a sliding cover extending between the rear surface of said frame member and an inwardly projecting segment of said sides, said second channel providing a means for lockably receiving a mirror positioned behind said cover whereby said cover can be moved between a closed position covering said mirror to an open position exposing said mirror for use, and a pair of elongated lips extending outwardly along the outer edge of said sides for mounting said frame to the visor body.

5. The apparatus as defined in claim 4 wherein said cover includes handle means adjacent one end thereof.

6. The apparatus as defined in claim 5 wherein said handle includes illumination means for providing illumination to said mirror when said cover is in an open position.

7. The apparatus as defined in claim 4 in which the hinge means is a living hinge formed by molding said frame member and channel defining sides in one piece.

8. A visor including a vanity mirror package comprising:
   a visor core including a mirror package receiving recess and means for lockably receiving a frame;

a vanity mirror package including a mirror and cover frame including elongated means interlocking with said core for snap fitting said package in said core, said package further including a cover for said mirror, said cover including illumination means thereon which is exposed for all positions of said cover.

9. The apparatus as defined in claim 8 wherein said cover is slidably mounted to said frame.

10. The apparatus as defined in claim 9 wherein said cover includes a handle and said illumination means is mounted in said handle.

11. The apparatus as defined in claim 10 wherein said illumination means includes a lamp and switch means.

12. The apparatus as defined in claim 11 wherein said switch means is mounted to said visor core to be actuated by movement of said cover for actuating said lamp.

* * * * *